US011840809B2

(12) United States Patent
Lee et al.

(10) Patent No.: US 11,840,809 B2
(45) Date of Patent: Dec. 12, 2023

(54) HYBRID TURF SURFACE AND SUPPORT THEREFOR

(71) Applicant: STADIA Turf Systems Pte. Ltd., Singapore (SG)

(72) Inventors: Hyo-Sang Lee, Goyang-Si (KR); Hamish Ross Sutherland, Romsey (AU); Mark A. Heinlein, Cincinnati, OH (US)

(73) Assignee: STADIA Turf Systems Pte. Ltd., Singapore (SG)

( * ) Notice: Subject to any disclaimer, the term of this patent is extended or adjusted under 35 U.S.C. 154(b) by 0 days.

(21) Appl. No.: 15/267,267

(22) Filed: Sep. 16, 2016

(65) Prior Publication Data

US 2017/0081808 A1  Mar. 23, 2017

Related U.S. Application Data

(60) Provisional application No. 62/220,309, filed on Sep. 18, 2015.

(51) Int. Cl.
*E01C 13/08* (2006.01)
*A01G 20/10* (2018.01)
(Continued)

(52) U.S. Cl.
CPC ........... *E01C 13/08* (2013.01); *A01C 1/00* (2013.01); *A01G 20/10* (2018.02); *A01G 20/20* (2018.02); *B32B 3/266* (2013.01); *B32B 5/026* (2013.01); *D04B 1/025* (2013.01); *D04B 1/22* (2013.01); *D04B 21/02* (2013.01); *D04B 21/10* (2013.01);
(Continued)

(58) Field of Classification Search
CPC ... E01C 13/08; E01C 2013/086; D04B 21/05; D04B 21/20; D04B 21/02; D04B 21/10; D04B 21/14; D04B 21/12; D10B 2505/202; D10B 2505/204; D06N 7/0063; D06N 7/0068; D06N 7/0071; D06N 2213/04; D06N 2213/06; Y10T 428/23979;
(Continued)

(56) References Cited

U.S. PATENT DOCUMENTS 4,007,307 A   2/1977  Friedrich
4,444,815 A * 4/1984  Friedrich ................ E01C 13/08
                                                              428/17
(Continued)

FOREIGN PATENT DOCUMENTS

CN   104264565        1/2015
CN   104264565 A  *  1/2015
(Continued)

OTHER PUBLICATIONS

Machine translation of KR 1020110002422 B1 (2012).*
(Continued)

*Primary Examiner* — Cheryl Juska
(74) *Attorney, Agent, or Firm* — Alicia M. Passerin, Esq.; Leech Tishman Fuscaldo & Lampl

(57) ABSTRACT

There is provided a hybrid turf support for use with natural grass to form a stable hybrid turf system, the hybrid turf support comprising a knitted reticulated support; and a plurality of grass-like fibers extending upwardly from the knitted reticulated support, the grass-like fibers comprising groups of fibers extending upwardly at intervals.

23 Claims, 9 Drawing Sheets

(51) Int. Cl.
*A01G 20/20* (2018.01)
*D04B 21/02* (2006.01)
*D04B 21/20* (2006.01)
*D04B 21/10* (2006.01)
*D04B 21/12* (2006.01)
*A01C 1/00* (2006.01)
*B32B 3/26* (2006.01)
*B32B 5/02* (2006.01)
*D04B 1/02* (2006.01)
*D04B 1/22* (2006.01)

(52) U.S. Cl.
CPC ............ *D04B 21/12* (2013.01); *D04B 21/20* (2013.01); *B32B 2255/02* (2013.01); *B32B 2307/7163* (2013.01); *B32B 2410/00* (2013.01); *D10B 2505/202* (2013.01); *E01C 2013/086* (2013.01)

(58) Field of Classification Search
CPC .......... A01C 1/00; A01G 20/00; A01G 20/10; A01G 20/20
See application file for complete search history.

(56) References Cited

U.S. PATENT DOCUMENTS

| | | | |
|---|---|---|---|
| 5,489,317 | A | 2/1996 | Bergevin |
| 6,029,397 | A | 2/2000 | Motz et al. |
| 6,094,860 | A | 8/2000 | Motz et al. |
| 6,242,062 | B1 | 6/2001 | de Vries |
| 2001/0033902 | A1 | 10/2001 | Seaton |
| 2008/0193226 | A1* | 8/2008 | Jones ................. E02D 29/0225 405/284 |
| 2008/0292819 | A1* | 11/2008 | Weghuis ................. E01C 13/08 428/17 |
| 2012/0107526 | A1 | 5/2012 | Lee |
| 2014/0050866 | A1* | 2/2014 | Ejtaszewski ............ E01C 13/08 428/17 |
| 2014/0250780 | A1 | 9/2014 | Lee et al. |

FOREIGN PATENT DOCUMENTS

| | | | | |
|---|---|---|---|---|
| CN | 204112187 | U | * | 1/2015 |
| CN | 204825564 | U | * | 12/2015 |
| EP | 3114282 | B1 | * | 3/2018 ............ D04B 21/16 |
| JP | S6314122 | B2 | * | 3/1988 |
| JP | 05311511 | A | * | 11/1993 |
| JP | 2007154623 | A | * | 6/2007 |
| JP | 2017225430 | A | * | 12/2017 |
| JP | 3221275 | U | * | 5/2019 |
| KR | 437986 | Y1 | * | 1/2008 |
| KR | 200437986 | | | 1/2008 |
| KR | 101044653 | | | 6/2011 |
| KR | 1020110002422 | B1 | * | 1/2012 |
| KR | 102202036 | B1 | * | 2/2023 |
| WO | 9956523 | | | 11/1999 |
| WO | 2015128730 | | | 9/2015 |

OTHER PUBLICATIONS

Machine translation of CN 101264565 A (2015).*
"How to Knit a Braid Cable," https://www.dummies.com/crafts/knitting/designs-patterns/how-to-knit-a-braid-cable/ (2019).*
"What is the difference between interlooping yarn and interlacing yarn?" https://www.quora.com/What-is-the-difference-between-interlooping-yarn-and-interlacing-yarn (2018).*

* cited by examiner

HYBRID TURF SURFACE AND SUPPORT THEREFOR

CROSS-REFERENCE TO RELATED APPLICATIONS

This application claims the benefit of U.S. Provisional Patent Application Serial No. 62/220,309 filed Sep. 18, 2015, which is incorporated herein by reference.

FIELD OF THE INVENTION

The invention relates to an improved support for use in hybrid turf surfaces and hybrid turf surfaces comprising that support. The invention is particularly suitable for use in hybrid turf surfaces for use in sporting venues such as a stadium, a training ground or a golf course.

BACKGROUND OF THE INVENTION

In this specification, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

It is known that a variety of different turf surfaces can be used to provide a surface for landscaping, sports and other uses. These turf surfaces include purely natural grass, purely artificial (also called synthetic) grass or a combination of both artificial grass and natural grass (often referred to as "hybrid turf" or "hybrid grass").

Historically, it has been thought that a natural grass turf surface represents the optimum surface for athletic competition, regardless of the sport being played. However, a natural grass turf surface requires significant maintenance, including regular mowing, watering, and fertilizing. Additionally, over the course of a sporting season, the use of a natural grass turf surface will typically cause wear and tear on the natural grass turf, particularly with sports such as American Football, Australian Rules Football, Gaelic Football, Hockey, Golf, Rugby Union, Rugby League and Soccer. Other factors may also contribute to the condition of the natural grass turf, including the geographical location of the sporting venue, the particular types of natural grass turf that may be suitable for that area, the duration of the growing season in that area, the micro-climate surrounding and within the sporting venue which will be influenced by architecture, and the construction and maintenance of the athletic field or golf course.

For these and other reasons, it is common for sporting venue proprietors to restrict the overall usage of the sporting venue, in order to preserve the natural grass turf surface for high profile events or competitions. However, given the relatively high cost of a typical sporting venue and the potential economic importance to the surrounding area, this practice is not ideal. It is also common for sporting venue proprietors to restrict the overall usage of a sporting venue for training purposes, in order to preserve the longevity and consistency of the natural grass turf surface. However, given the relatively high demand of a typical training ground and the limited alternatives available, this practice is not ideal.

For these and other reasons, significant efforts have been made over the years to enhance the durability and consistency of natural grass turf surfaces. One example is a product referred to as "Prescription Athletic Turf" (or PAT) which used primarily a sand-based subsurface for the natural grass turf to promote uniformity in active drainage of the natural grass turf surface during heavy rainfall, and wicking of water into the root zone during times of sub-irrigation. However, the use of a predominantly sand-based subsurface reduced the overall capability for the subsurface to hold or retain the roots of the natural grass turf plants, particularly with certain types of natural grass turf, certain climates and in certain growing environments.

Another example is a product which stabilized the root zone with additional components to enhance the stability of the natural grass turf surface. For example, the Desso® GrassMaster system involves injecting into a natural grass turf subsurface typically 200 mm long fibers which entangle with the root zone of the natural grass turf plants thereby helping reinforce the subsurface and reducing wear and tear. The injected fibers are buried up to about 180 mm and typically extend 20 mm into the leaf zone and form part of the playing surface. The depth of injection is necessary to anchor the fibers and the uniform spacing of typically 20 mm by 20 mm provides consistency in playing performance. The resultant natural grass turf surface is about 3-5% artificial grass and 95-97% natural grass. However, the process for injecting the fibers into the subsurface is performed by a machine, takes a relatively long time and is relatively expensive. For example, it typically takes 2 weeks to install 8000 square meters using 2 machines. Further, the system requires a suitable natural grass turf subsurface of minimum 180 mm depth to receive the needles and the system must be injected into a level surface so that the fibers benefit the natural grass turf surface equally and consistently. Installation of such a system is thus difficult as well as expensive. The depth of injection and the resulting reinforcing effect on the root zone requires regular maintenance to ensure that the playing surface does not become too reinforced or hard. In addition, the injected system is a permanent installation which cannot be replaced if damaged in preparation for the next event, rather it must be regrown onsite. Accordingly, injected systems are not suitable for use in sporting venues that rely on replacement turf to repair damaged natural grass turf, often in a short time period between events.

Some hybrid turf relies on a combination of natural grass and artificial grass in which the buried artificial grass stabilizes the root zone for the natural grass. Conventionally, artificial turf has a structure formed by densely tufting grass-like fibers on an artificial turf-based textile fabric, or densely weaving the pile yarns together with the textile fabric. For example, U.S. Pat. No. 5,489,317 discloses an artificial mat based stabilized natural turf in which natural grass is combined with an artificial turf mat. The mat includes a horizontally oriented primary backing to which artificial grass ("grass-like fibers") are tufted. The upright grass-like fibers remain buried in the root zone to stabilise the root zone with the roots extending downward through the horizontal component of the mat. However, the structure of the primary backing caused some difficulties, including restricted drainage and aeration, causing poor root development and weakened natural grass, which undermined the playing performance of the surface. Similar drainage and aeration problems arise with the system in U.S. Pat. No. 6,242,062. In these two systems, the grass-like fibers do not extend into the leaf of the natural grass and thus do not protect the leaf of the natural grass from wear and tear, and do not enhance the playing characteristics of the leaf of the natural grass (for example ball roll).

Another example is U.S. Pat. No. 6,029,397 which discloses artificial grass fibers within a stabilization zone. The primary backing comprises biodegradable jute to which the grass-like fibers are tufted. This system provided better root growth and stronger plants due to better drainage and aeration, but the benefits of stabilisation became less consistent over time and with use, after the jute biodegraded. This difficulty was addressed in U.S. Pat. No. 6,094,860 by adding a non-biodegradable backing to provide consistent, lasting stabilization over time. In these two systems, the grass-like fibers do not extend into the leaf of the natural grass and thus do not protect the leaf of the natural grass from wear and tear, and do not enhance the playing characteristics of the leaf of the natural grass (for example ball roll). However, these tufted systems have the benefit that they are well adapted to all commonly used maintenance techniques, including those maintenance techniques that are specifically tailored to suit warm-season grasses and cool-season grasses. This versatility in maintaining the system would be reduced if the grass-like fibers extended into the leaf of the natural grass, because some of these maintenance techniques would damage and remove the protruding grass-like fibers.

In the hybrid systems where the grass-like fibers are tufted, if the grass-like fibers did extend into the leaf of the natural grass, they typically do not present in a uniform pattern, rather they present in a pattern of greater concentration per row. This lack of uniformity would impact the wear patterns of the natural grass and would impact the playing characteristics of the natural grass (for example ball roll). Furthermore, the grass-like fibers are not well anchored to the backings because unlike artificial turf there is no coating applied to create the tuft lock, hence if the grass-like fibers did extend into the leaf of the natural grass, it is likely the boots of players would dislodge these grass-like fibers and the benefits of stabilization would be lost. These tufted systems are not well adapted to all commonly used maintenance techniques, including those maintenance techniques that are specifically tailored to suit warm-season grasses and cool-season grasses, because some of these maintenance techniques would damage and remove the protruding grass-like fibers. For example during annual renovation when the natural grass is removed from the grass-like fibers by way of "fraise" mowing.

U.S. Pat. No. 6,242,062 discloses a combined artificial and natural turf system wherein the artificial component includes a fabric primary of non-degradable weft and warp threads. Grass-like fibers are co-woven into the fabric primary at the intersections of the weft and warp threads, and extend upwardly therefrom. In one embodiment, the fabric primary includes degradable weft and warp threads which decompose to provide openings defined by the non-degradable threads. This is sold commercially as XtraGrass™. In another embodiment, the degradable threads are omitted and the openings are provided at the outset. With either embodiment, natural grass grows through the openings, while robust pieces of fabric remain at the intersections of the non-degradable threads. Further, the non-degradable threads could be melted together, for extra strength at the intersections. This hybrid turf is typically used as a substitute for artificial turf rather than as a value-add for natural grass. For example the 'face-weight' of the grass-like fibers and the backing weight are both similar to that of artificial turf. The weft and warp threads create a dense fabric primary anchoring the grass-like fibers and provide a strong robust construction. The woven grass-like fibers typically extend 20 mm into the leaf zone and form part of the playing surface reducing the wear and tear on the natural turf. The grass-like fibers are woven in a uniform spacing of typically 30 mm×30 mm providing some consistency in the playing performance of the surface. This system can be used continuously even after the natural grass has worn out. However, this construction also compromises the growing environment for the natural grass, due to the growing environment above the backing performing differently to the growing environment below the backing, which inconsistency can adversely affect the health of the natural grass, for example restricted root growth through the dense primary or restricted root growth due to mismatched moisture porosity and air porosity above and below the dense primary. The dense fabric primary also contributes to surface hardness, for example, if the sand infill is too shallow (less than 35 mm) or if regular maintenance of the sand infill within the matrix of grass-like fibers is not undertaken, then the resultant surface hardness will affect the playing performance of the surface.

With respect to each of the systems discussed above, if the system is removed from the playing surface, that is the natural grass turf is damaged and needs to be replaced, then the system is typically removed as a whole, grass, fiber, backing and root zone, and typically in limited time because of frequent use. The synthetic and organic materials are not separated and are therefore difficult to recycle. Typically, the combined materials are taken to and disposed of as landfill, an expensive and unsustainable outcome. Other systems have used a top down approach with the artificial turf mat pegged on top of the natural grass surface. For example, US publication no 2012/0107526 (application no U.S. Ser. No. 13/281,216) and its continuation-in-part US publication no 20140250780 (see also Korean Patent Registration No. 10-1044653 and Korean Utility Model Registration No. 20-0437986) disclose an artificial turf mat which has a "honeycomb" design which maximises the space for the natural grass to grow. The artificial turf mat has a honeycomb formation formed from knitted braids of yarn which are in part knitted together, then stretched apart to form spaces in which natural grass can grow. The knitted braids of yarn have supporting yarns as a base with the yarn forming the grass-like fibers knitted as a top layer with loops which are cut to form the tufts. The yarns used in the base of the braid can be non-biodegradable or biodegradable. This honeycomb system is designed to overlay a planting of natural grass, rather than to create the foundation for a natural grass planting. In this regard, the honeycomb exists within the verdure of the sward, not below the verdure as is the case with U.S. Pat. No. 6,094,860 and other "backing-type" bottom-up stabilizer products. The honey-comb construction lacks stability and must be pegged upon installation, hence it is not ideal for establishing a foundation for natural grass. By design, the honeycomb system is also not well suited as a replacement turf, especially lay and play replacement turf where a foundation structure is required. The honey-comb design maximizes the plurality of voids which suits the overlay installation approach, where the planted seeds or plant material must grow up through the honeycomb system. Further, the honey-comb design does not have a uniform distribution of grass-like fibers. The grass-like fibers extend from each knot forming the knitted braids, which braids define the honey-comb structure. This uneven fiber distribution impacts the playing characteristics of the natural grass (for example ball roll and ball bounce), although the fibers do extend into the natural grass leaf canopy and offer the natural grass protection from wear and tear. Further, the honey-comb design creates a bias in the directional orientation of the grass-like fibers. Rather than be independent of each other, they lay in a similar direction to each other, which creates an uneven presentation of fibers, which impacts the playing characteristics of the natural grass (for example ball roll). By design the manufacture of the system is relatively fast and economical. After the knitted construction is coated it is stretched and expanded by 2 to 10 times before being heat treated to maintain the expanded form. The honeycomb system has enjoyed some degree of commercial success in the golf course market and the commercial landscape market, but not in the sporting venue market. If the system is removed from the surface, the materials may be separated and recycled.

Korean Patent No. 20-0437986 discloses an artificial lawn mat which has a woven base fabrication, which comprises a synthetic 'coupling' yarn, into which a 'first' natural yarn is inserted (woven). This woven base fabrication is described as a 'net patterned texture' which net texture is closed rather than open. A 'second' synthetic yarn is also inserted (woven) in the coupling yarn, at a predetermined width on the base fabrication, so as to knit a support net texture, whereupon an artificial grass yarn is woven into this support net texture, and the predetermined width between each support net texture (which now includes the artificial grass yarns) creates the space for natural grass to grow.

Korean Patent No. 20-0437986 discloses a tight base fabrication for the purpose of preventing the ground from sinking, or getting 'dug' because the plants roots are often missing. These purposes would not be achieved with an open reticulated net. The tight base fabrication impedes growth of the natural grass plants by negatively impacting on drainage, aeration and root development causing the natural grass plants to be less healthy. The tight base fabrication will thus also lead to lower performance of the playing surface, by way of hardness in the playing surface.

Korean Patent No. 20-0437986 further discloses an artificial lawn mat according to the above, wherein the coupling yarn used in the base fabrication is formed by fabricating a knit loop texture in which closed knit loop shapes proceed continuously in a longitudinal direction, while the first insertion yarn is formed by aligning the coupling yarn for base fabrication at an equal interval in each course and weaving at least two loops in the knit loop texture to fabricate a 'net patterned texture', and the second yarn is formed by weaving at least two courses in the knit loop texture of the base texture, thereby knitting the support net texture of the artificial lawn fabric. Korean Patent No. 20-0437986 discloses a continuous population of fibers in a honey-comb design. The resultant uneven spacing of fibers will detrimentally impact the performance of the playing surface, for example ball roll, ball bounce, player footing etc.

It is important for sporting venues to have a natural grass turf surface which is healthy, robust, consistent, safe and replaceable and which has good playing characteristics. There is a need for an improved natural grass turf surface, particularly for use in sporting venues.

SUMMARY OF THE INVENTION

The present invention provides a hybrid turf support for use in hybrid turf systems. The hybrid turf support according to the invention functions as an additive to an otherwise natural grass turf surface to enable healthier natural grass growth, improve natural grass grow-in characteristics, support year-round natural grass maintenance, enhance natural grass durability, provide superior consistency in playing surface performance, reduce plant damage to the leaf, crown, and roots, and protect the plant from scalping, divotting or other damage during sport events, when compared with other hybrid turf systems used in sporting venues.

According to a first aspect of the invention, there is provided a hybrid turf support for use with natural grass to form a stable hybrid turf system, the hybrid turf support comprising:
(a) a knitted reticulated support comprising:
(i) a first plurality of longitudinally extending members oriented in a first direction; and
(ii) a second plurality of laterally extending members oriented in a second direction which is substantially perpendicular to the first direction, wherein each of the plurality of laterally extending members is anchored at each end to at least one of the plurality of longitudinally extending members;
wherein the first plurality of longitudinally extending members intersect the second plurality of laterally extending members to define a plurality of substantially rectangular-shaped openings suitable for natural grass to grow; and
(b) a plurality of grass-like fibers extending upwardly from the knitted reticulated support, the grass-like fibers comprising groups of fibers extending upwardly at substantially uniform intervals,
wherein the plurality of grass-like fibers each has a top which protrudes and extends upward from the knitted reticulated support, and a bottom fixed to the knitted reticulated support.

Preferably, the plurality of grass-like fibers extend upwards at the intersections of the first plurality of longitudinally extending members with the second plurality of laterally extending members. Preferably, the plurality of grass-like fibers are knitted into each of the plurality of longitudinally extending members.

Preferably, the substantially rectangular-shaped openings are substantially square-shaped openings. Preferably, the substantially rectangular-shaped openings each have substantially uniform dimensions to the other substantially rectangular-shaped openings. In this specification and in the claims, values of size and dimension are specified within the normal restrictions of manufacturing tolerances.

Preferably, the intervals between the adjacent intersections along the longitudinal and lateral directions are each independently in the range from 3 mm to 50 mm. More preferably, the intervals are in the range from 4 mm to 22 mm. Most preferably, the intervals are in the range from 4.23 mm to 21.17 mm. The dimensions of the openings in the hybrid turf support will depend on the application. For example, the spacing for a permanent installation is typically 12.70 mm×12.70 mm or 16.93 mm×16.93 mm or 21.17 mm×21.17 mm, whereas for a temporary installation it is typically 4.23 mm×4.23 mm or 8.47 mm×8.47 mm. If an extra resilient piece of replacement turf is required then the spacing may be 4.23 mm×4.23 mm or 8.47 mm×8.47 mm. The spacing may be influenced by:
  sport (for example rugby requires greater surface stability than soccer),
  grass variety (warm season grasses have greater lateral stability than cool season grasses), and
  use (for example, a temporary installation over an athletics track compared to a permanent installation over a root zone).

In another preferred embodiment, the plurality of grass-like fibers extend upwards at spaced out intersections of the first plurality of longitudinally extending members with the second plurality of laterally extending members. For example, if the substantially square-shaped openings are 8.45 mm×8.45 mm then the spacing of the plurality of grass-like fibers is 16.93 mm×16.93 mm. In an alternative preferred embodiment, the plurality of grass-like fibers extend upwards at every third intersection of the first plurality of longitudinally extending members with the second plurality of laterally extending members. For example, if the substantially square-shaped openings are 4.23 mm×4.23 mm then the spacing of the plurality of grass-like fibers is 12.70 mm×12.70 mm.

According to a preferred embodiment of the invention, there is provided a hybrid turf support wherein the first plurality of longitudinally extending members comprises braids formed from knitting:

(a) one or more warp yarns to form the longitudinally extending members;
(b) portions of two or more weft yarns to form the laterally extending members; and
(c) one or more yarns for forming grass-like fibers,
wherein the one or more weft yarns for forming the second plurality of laterally extending members extend laterally between the plurality of longitudinally extending members so as to form the plurality of laterally extending members; and
wherein the first plurality of longitudinally extending members are aligned at a constant parallel intervals and linked together at intersections with the second plurality of laterally extending members which are also aligned at constant parallel intervals.

Any material commonly used in the art for making a hybrid turf support and which is capable of being knitted may be used to make the hybrid turf support according to the invention. A person skilled in the art would know that yarns which are soft, flexible, pliable and/or elastic are likely to be suitable. A person skilled in the art would also know that yarns that are hard, abrasive, inflexible, inelastic and/or oversized are likely to be unsuitable. A person skilled in the art would also know that there are other relevant characteristics such as burst strength, tear strength and tensile strength. The yarns may be monofilaments, multifilaments, fibrillated, tape or texturized. For example, the yarns may be selected from the group consisting of biodegradable yarns and/or non-biodegradable yarns, and these yarns may be of a biological (natural) or non-biological (synthetic) origin and/or composition, including but not limited to, biodegradable yarns of natural fibers, biodegradable yarns of synthetic fibers, and mixtures thereof. Non-biodegradable synthetic yarns are preferably constructed from a substantially flexible material, for example, polyethylene, polypropylene, polyamides, polyolefins or mixtures thereof. Biodegradable synthetic yarns are preferably constructed from a substantially flexible bioplastic material, for example, polylactic acid, polyhydroxyaalkanoate, bioethylene or mixtures thereof. Biodegradable non-synthetic yarns are preferably constructed from a substantially flexible material, for example protein fibers such as wool or silk, cellulose fibers such as rayon, bast/stem fiber such as kenaf, flax, jute, hemp or ramie, seed hair fiber such as coir, cotton or kapok, leaf fiber such as sisal, or mixtures thereof. The yarns may be chosen depending on the desired characteristics for the final turf system, for example, softness, resilience, or water retention. The yarns may also be treated to provide beneficial properties, for example, impregnated with insect repellent or coated to provide resilience The number of yarns used will depend on the characteristics of the yarns used and the desired purpose for the resultant hybrid turf surface. For example, if a stronger construction is desired, then more yarns may be used for either or both of the warp and weft. In a preferred embodiment, there is one warp yarn and two weft yarns. Preferably, that the two weft yarns have different properties, including surface tension, so that they, together, create greater stability. More preferably:

(a) one weft yarn comprises polyester with a fiber thickness of 1000-4000 denier, more preferably 1000 denier. Polyester provides flexibility and strength. In particular, polyester is stronger and more flexible than polypropylene or polyethylene. Tensile strength may be a problem if the thickness is less than 1000 denier and knitting (knot size) may be difficult if the thickness is greater than 4000 denier;
(b) the other weft yarn(s) comprise a polyethylene monofilament (round) with a diameter of 200-500 microns, more preferably 280 microns. Polyethylene mono round yarns provide stability and elasticity. Stability may be a problem if the diameter is less than 200 microns and knitting may be difficult (knot size or too stiff for knitting) if the diameter was greater than 500 microns; and
(c) the one warp yarn comprises polyester with a thickness of 1000-4000 denier, more preferably 1000 denier. Polyester provides greater stability because it has less elasticity. Tensile strength may be a problem if the thickness is less than 1000 denier and knitting (knot size) may be difficult if the thickness is greater than 4000 denier.

Any material commonly used in the art for making grass-like fibers may be used. The grass-like fibers may be monofilaments, multifilaments, fibrillated, tape or texturized. For example, the grass-like fibers may be selected from the group consisting of biodegradable synthetic grass-like fibers, non-biodegradable synthetic grass-like fibers, biodegradable non-synthetic grass-like fibers, non-biodegradable non-synthetic grass-like fibers and mixtures thereof. Non-biodegradable synthetic grass-like fibers are preferably constructed from a substantially flexible material, for example, polyethylene, polypropylene, polyamides, polyolefins or mixtures thereof. Biodegradable synthetic grass-like fibers are preferably constructed from a substantially flexible bioplastic material, for example, polylactic acid, polyhydroxyaalkanoate, bioethylene or mixtures thereof. Biodegradable non-synthetic grass-like fibers are preferably constructed from a substantially flexible material, for example protein fibers such as wool or silk, cellulose fibers such as rayon, bast/stem fiber such as kenaf, flax, hemp, jute or ramie, seed hair fiber such as coir, cotton or kapok, leaf fiber such as sisal, or mixtures thereof. The grass-like fibers may be chosen depending on the desired characteristics for the final turf system, for example, softness, resilience, or water retention. The yarns may also be treated to provide beneficial properties, for example, impregnated with insect repellent or coated to provide resilience.

The grass-like fibers may be monofilaments or multifilaments, depending on the desired characteristic for the hybrid turf system. For example, the grass-like fibers may be represented in the range of from 6 (3 end) monofilament fibers per bundle to 44 (22 end) monofilament fibers per bundle, with each monofilament having a single yarn thickness in the range of from 100 micron to 700 micron and a single yarn weight in the range of from 900 denier to 3500 denier. Preferably, each of the grass-like fibers will be represented in the range of from 6 (3 end) monofilament fibers per bundle to 12 (6 end) monofilament fibers per bundle, with each monofilament having a single yarn thickness in the range of from 300 micron to 450 micron, and each monofilament having a single yarn weight in the range of from 1800 denier to 3300 denier, so that the multi-filament fiber has a total thickness in the range of from 5400 to 19,800 denier. If the total thickness of the grass-like fibers is less than 5400 denier, the strength and resilience of the grass-like fibers made from current materials may be decreased which reduces the protection of the natural turf and would impact the wear patterns of the natural grass and would impact the playing characteristics of the natural grass (for example ball roll). When the total thickness thereof exceeds 19,800 denier, the grass-like fibers may become less soft and flexible, and the likelihood of skin abrasion and skin burn from players sliding on the fibers may be increased.

The length of the grass-like fibers may differ depending on the intended use of the hybrid turf system. Preferably, the top of the grass-like fiber protrudes and extends upward from the knitted reticulated support, while the bottom thereof is fixed to the knitted reticulated support. Preferably, each of the grass-like fibers extends upwardly for a length in the range of from 20 mm to 80 mm from the knitted reticulated support, i.e. 20, 25, 30, 35, 40, 45, 50, 55, 60, 65, 70, 75 and 80 mm. Typically in a soccer venue, the grass-like fibers protrude and extend upwardly 60 mm to 70 mm from the knitted reticulated support, with 20 mm of this 60 mm-70 mm extending above the layer of growth media to support the leaf blades of the natural grass turf. Preferably in a sporting venue, longer grass-like fibers are used to extend above the layer of growth media to support the leaf blades of the natural grass plants, thereby increasing the playing hours of the natural grass plants by protecting the natural grass plants from wear and tear. However, this needs to be balanced with ensuring that the grass-like fibers do not adversely impact on playing characteristics and turf maintenance. For example, if the length of the grass-like fiber is less than 20 mm, then:
  (a) the grass-like fiber would protrude less from growth media layer and may not provide:
    (i) adequate protection to the natural turf; and/or
    (ii) adequate consistency in the playing characteristics of the natural grass (for example ball roll); and/or
  (b) the growth media layer that sits above the hybrid turf support is likely to be too shallow and there is a risk that:
    (i) a player's boot studs may catch the hybrid turf support and cause a trip hazard; and/or
    (ii) the weight of the growth media layer will not be sufficient to allow lay and play if installed for this purpose.
Conversely, if the length of the grass-like fiber exceeds 80 mm, then it may be difficult to infill the grass-like fiber with the growth media layer because it is difficult to maintain the rigidity of the grass-like fiber during the infilling process. This lack of rigidity may also adversely impact on playing characteristics, turf maintenance and protection of the natural grass turf. In addition, excess fiber height is not desirable from a cost perspective, and in practice, would be removed via mowing of the natural grass turf.

In some embodiments, the hybrid turf support further comprises a coating to further stabilise the knitted reticulated support. The use of a coating will depend on the composition of the yarns. Examples of a suitable coating include latex, polyurethane, acrylic, and ethylene-vinyl acetate. In a particularly preferred embodiment, the coating is heat treated to provide further stability.

The hybrid turf support according to the invention provides the grass-like fibers with improved anchoring when compared with either tufted or woven grass-like fibers and provides a support which is more open than tufted and woven backings.

According to a second aspect of the invention, there is provided a hybrid turf system comprising a hybrid turf support for use with natural grass according to the present invention.

In a preferred embodiment, the hybrid turf system comprises:
  (a) a surface adapted for supporting a natural grass turf surface;
  (b) a hybrid turf support for use with natural grass turf as per the present invention;
  (c) a layer of growth media located on the hybrid turf support; and
  (d) a plurality of natural grass plants or precursors thereof wherein the roots extend downwardly through the layer of growth media and the hybrid turf support, and wherein some of the roots engage with the hybrid turf support.

A method of creating a hybrid turf system comprising a hybrid turf support according to the invention and natural grass turf, the method comprising the steps of:
  (a) placing a hybrid turf support according to the invention on a surface adapted for supporting a natural grass turf surface located at a growth site; and
  (b) placing on the hybrid turf support a layer of growth media and natural grass turf precursors, such as seeds, sprigs or plants, to form the natural grass turf.

According to a preferred embodiment of the invention, the hybrid turf system has a ratio of an area of grass-like fibers to an entire area of the natural grass turf and the grass-like fibers in the hybrid turf in a range of from 2% to 7% in the resultant hybrid turf system, so as to achieve improved playing characteristics (regular bounce and rolling of a ball) and improved surface performance (traction, impact, hardness, shock absorption, deformation, energy restitution) during a sporting event. The percentage ratio is calculated based on the leaves of the natural grass turf plants (not the plants which each have a number of leaves) and assumes that the plant has a full sward of leaves. Typically, this is equivalent to a ratio of 2% to 7% artificial turf to 93 to 98% natural grass turf. If the ratio of an area of grass-like fibers to the entire area of the natural grass turf and the grass-like fibers at the target site exceeded 7%, this could result in less natural grass turf playing characteristics and more grass-like fiber playing characteristics which will influence rotational resistance and other surface performance measures.

In one embodiment, the spacing of the plurality of grass-like fibers is 12.70 mm×12.70 mm and the ratio of an area of grass-like fibers to an entire area of the natural grass turf and the grass-like fibers in the hybrid turf is 6.1% grass-like fibers to 93.9% natural grass turf. In another embodiment, the spacing of the plurality of grass-like fibers is 16.93 mm×16.93 mm and the ratio of an area of grass-like fibers to an entire area of the natural grass turf and the grass-like fibers in the hybrid turf is 3.5% grass-like fibers to 96.5% natural grass turf.

The hybrid turf system according to the invention can be installed and established onsite at the target site, e.g. a sporting venue; or the hybrid turf system according to the invention can be planted and established offsite at a nursery, and once matured, made ready for installation, as a lay and play product.

The layer of growth media can be any suitable media for growing natural grass turf plants. Examples of suitable growth media include natural sand and soil, synthetic media (such as polymers, including crumb rubber), and organic media (such as coconut fiber or cork).

When the hybrid turf system according to the invention is prepared offsite at a nursery, a retention backing may be used in addition to the hybrid turf support to retain the growth media in place while infilling. A retention backing may also be desirable in some instances when infilling onsite installations at the target site, e.g. sporting venue. Typically, transport and installation of a hybrid turf system relies on the retention backing providing the necessary support through the processes to guarantee the integrity of each turf roll. Further, depending on the choice of retention backing, it may be that the hybrid turf system of the invention can better accommodate standard turf management techniques, including solid or hollow-tine aeration and mechanical cleaning.

There are many known materials which may be used as the retention backing depending on the desired properties at the nursery and/or target site. The retention backing may be composed of one or more materials. Typically, the retention backing would be root permeable and free draining. These materials include both biodegradable and non-biodegradable materials as well as combinations of both biodegradable and non-biodegradable materials. The biodegradable and non-biodegradable materials may be woven together into a single layer backing or the backing may comprise a layer of biodegradable material and a layer of non-biodegradable material as described in Australian patent nos. 738632 and 769873. Examples of biodegradable retention backings are woven viscose, cotton, or jute/hessian (100 g/sqm-300 g/sqm), preferably viscose 240 g/sqm. Examples of non-biodegradable retention backings are non-woven geotextiles (100 g/sqm-300 g/sqm), preferably 140 g/sqm. The retention backing must have sufficient density to capture and support the infill, at least until the plant's biomass and roots are established and can perform this function/attribute.

When installed (planted) at the target site, generally it is desirable to use a biodegradable retention backing which biodegrades as and when the plants biomass and roots develop. This outcome maximises the plurality of voids which promote a healthy, durable natural grass turf and the development of the root system. When installed (planted) at the nursery site, generally it is desirable to also use a biodegradable retention backing which biodegrades as and when the plants biomass and roots develop. It is also possible to use a non-biodegradable retention backing at the nursery site which remains intact until such time the hybrid turf system is relocated from the nursery site to the target site, when the non-biodegradable retention backing may or may not be removed, depending on whether the installation is permanent or temporary at the target site, which outcome is determined by the venue and its event schedule.

If the installation is permanent, the removal of the non-biodegradable retention backing will maximise the plurality of voids which promote a healthy, durable natural turf and the development of the root system. If the installation is temporary, the non-removal of the non-biodegradable retention backing will lessen the plurality of voids which will limit the development of the root system and thereby facilitate subsequent removal, but it will maintain drainage and some root penetration which are required to maintain a healthy natural grass turf, with durability commensurate with the intended temporary use. However, it is also possible that the hybrid turf system may be installed (planted) at the target site with a non-biodegradable retention backing if subsequent removal is contemplated. It is also possible that the hybrid turf system may be installed (planted) at the nursery site with a biodegradable retention backing. In this case, either the biodegradable retention backing will not biodegrade prior to the relocation of the hybrid turf system, hence providing the necessary support through the processes (harvest, transport, installation) to guarantee the integrity of each turf roll, or the biodegradable retention backing will biodegrade prior to the relocation of the hybrid turf system, but the hybrid turf support according to the invention provides the necessary support through the processes (harvest, transport, installation) to guarantee the integrity of each turf roll.

The retention backing (biodegradable and non-biodegradable) is typically attached to the underside of the hybrid turf support in a manner which, if desired, enables it to be removed with ease at the time of harvest or at the time of installation (if there is a concern that growth media may be displaced during harvest and/or transport). For example, the retention backing may be 'tack-glued', or adhered with heat, or alternative fixing processes may be used. Alternatively, if enough time has elapsed at the nursery and the retention backing is biodegradable, the retention backing may have degraded and no longer exist at the time of harvest. Alternatively, the retention backing may be treated with a degradation agent to cause it to degrade after installation (planting and/or relocation).

In a preferred embodiment, a viscose retention backing (preferably 240 g/sqm) is attached to the underside of the hybrid turf system for the purpose of sand infilling. The viscose retention backing has been confirmed to biodegrade as and when the natural grass plants' biomass and roots develop, realising the plurality of voids which are desired for drainage and root development, and which are essential for a healthy, durable natural grass turf. The viscose retention backing may be used for both onsite and offsite plantings.

The key to a strong and healthy natural grass turf plant is a strong root system. Young roots are vigorous and responsive, for example they readily absorb nutrients and water, whereas, old, mature roots, are less responsive and less efficient. If the hybrid turf system is installed (planted) on an impermeable root membrane, for example plastic at the nursery, and the roots have "balled" on the underside of the hybrid turf system over time, it is important that these old roots (dead organic material) are removed at the time of harvest or subsequent installation. The removal of these old roots will lessen congestion in the growth media and will allow more oxygen to enter the growth media to benefit the new roots (and allow carbon dioxide to exit the growth media). The removal of old roots improves drainage from the turf surface through the growth media which will also benefit the new roots. The removal of old roots also stimulates the creation of new roots, via the process known as "root-pruning". All are essential for the establishment of a new, strong root system and the creation of natural grass turf plants which are healthier, stronger and durable. Hence the health of the root system of the natural grass turf in the hybrid turf system can be improved via using a removable root-pruning backing as taught in international patent application no WO 2012/159145.

The hybrid turf system according to the invention can be used as a permanent hybrid system, or as a temporary hybrid system.

When used as a temporary hybrid system, the hybrid turf system according to the invention can be planted and established offsite at a nursery; matured, harvested and installed, just like the permanent hybrid system. However, a temporary hybrid system can be removed from the target site, e.g. a sporting venue, returned to the nursery, and made ready for its next installation. In this context, hybrid turf system according to the invention is a lay and play system that can be reused a number of times.

Preferably, for a temporary hybrid system, the hybrid turf support according to the invention has a greater density. For example, substantially square-shaped openings of 4.23 mm×4.23 mm with plurality of grass-like fibers spacing of 12.7 mm×12.7 mm (total weight approximately 1470 g/sqm) or substantially square-shaped openings of 8.45 mm×8.45 mm with plurality of grass-like fibers of 16.9 mm×16.9 mm (total weight approximately 1050 g/sqm), compared to substantially square-shaped openings and plurality of grass-like fibers spacing of 12.7 mm×12.7 mm (total weight approximately 920 g/sqm) or 16.9 mm×16.9 mm (total weight approximately 650 g/sqm) used for permanent systems. The closer spacing provides the temporary hybrid system with greater support and stability for reuse. The approximate weights do not include a viscose retention backing or associated glue.

A preferred embodiment of the present invention provides a hybrid turf system adapted for use as a replacement turf system wherein a new hybrid turf system can be installed ready for immediate play and the old hybrid turf system according to the invention can be recycled by way of separating the components and reusing some of the components. In this embodiment, the hybrid turf support according to the invention would be reusable. For example, the old hybrid turf system could be removed from its installation site, the components separated and the hybrid turf support reused with a fresh natural grass turf grown thereon.

Once separated from the growth medium and organic material, the hybrid turf support, depending on its condition, may either be reused as a support for another hybrid turf system or it may be recycled. Recycling of the hybrid turf support will depend on the materials used and may require the various yarns to be separated. It will be easier to recycle a hybrid turf support if the yarns used in the warp, weft and grass-like fibers were made from the same material, for example, polyethylene.

This ability to reuse or recycle the hybrid turf support results from the fact that the elements of the hybrid turf support are knitted together. After removal, old turf passes through an extraction machine (either onsite or offsite) which aggressively agitates both the upper surface (natural grass) and lower surface (support). In the prior art systems wherein the grass-like fibers are only tufted to the support, the machine typically causes the various components of the support to be torn/pulled apart resulting in these components being mixed into the natural grass waste and growth medium waste. In contrast, one embodiment of the hybrid turf support according to the invention is a strong/robust product which can withstand this agitation and be reused. The openings in the hybrid turf support according to the invention (which are typically much more than the prior art systems) also assist with easier separation from the natural turf and growth medium and provide a product which requires little additional cleaning before reuse or recycling.

According to another aspect of the invention, there is provided a method for maintaining a hybrid turf surface, the method comprising:
removing at least a portion of an existing hybrid turf surface comprising a hybrid turf support according to the invention;
installing a replacement hybrid turf system according to the invention, which will be ready for immediate play;
optionally, separating the hybrid turf support from the removed hybrid turf system; and
recycling the hybrid turf support.

In a preferred embodiment, the hybrid turf support according to the invention is biodegradable, whereby the hybrid turf support is used for a pre-determined period of time and then subsequently disposed of, thereby allowing the old hybrid turf system to be recycled with the growth media and natural grass, rather than needing to be separated. This allows the removal process to be undertaken in one process, either by rolling up or stripping out, which is more economical and efficient, than having to include a separation process.

The ability to recycle used hybrid turf supports will create economic benefits and also environmental benefits since it will avoid the need to dispose of the used hybrid turf supports in landfill.

According to a third aspect of the invention, there is provided a method for removing a hybrid turf system comprising growth media, natural grass turf and a hybrid turf support according to the invention from a site, comprising:
(a) cutting the hybrid turf system into one or more strips of a predetermined width;
(b) causing the cut strip of hybrid turf to be directed upwardly to a separation station for separating the natural grass turf and the growth media from the hybrid turf support, and
(c) collecting each of the separated hybrid turf support and the mixture of natural grass turf and growth media for reuse or recycling.

Depending on the embodiment of the invention, the advantages of the present invention include one or more of the following:
(a) grass-like fibers which are uniformly spaced within the natural grass turf to protect the natural grass turf from wear and tear, and damage, and which uniform spacing does not adversely affect the playing characteristics of the natural grass (for example ball roll), but rather enhances them through greater consistency;
(b) grass-like fibers which protect the natural turf, reducing damage to the leaf, crown, and roots, and which protect the plant from scalping, divotting or other damage during sport events, creating a durable and consistent playing surface;
(c) grass-like fibers facilitate year-round maintenance of the natural turf, thereby ensuring the playing surface receives regular maintenance year-round without disruption to the event schedule;
(d) the hybrid turf support according to the invention improves natural grass grow-in characteristics, by reducing the time required for a grow-in, and by providing an ideal grow-in environment;
(e) more open space within the hybrid turf support in which natural grass can grow healthier and more easily, by ensuring drainage, aeration and root growth is consistent in both the growth media layer and growth media underneath;
(f) more open space within the hybrid turf support, ensuring the growth media remains dynamic 3D within, rather than locked within, thus ensuring the playing surface remains dynamic underfoot, not hard and compacted, for the benefit of player performance and recovery;
(g) a hybrid turf system suited to disposal installations, temporary installations and permanent installations;

(h) a hybrid turf system is capable of having damaged areas of turf replaced;

(i) a hybrid turf system suited for use in multi-use venues that host sport and non-sport events, where the hybrid turf support provides load bearing support for structures placed on the surface; and (j) a hybrid turf system whose components may be reused or recycled.

The present invention differs from knitted synthetic turf and from prior art, such as US 20140250780. Knitted synthetic turf is known to industry, where each knot in the braid is connected to each adjacent knot in the adjacent braid, and each knot has grass-like fibers extending from it. The knitted synthetic turf is coated and stable, and suitable for use as a synthetic turf, but not suitable for use as a hybrid turf due to the lack of space for natural grass plants to grow. From this design and construction, the honeycomb system was invented, as disclosed in US 20140250780 where only some knots where connected to their adjacent knots, thus allowing the braids to be stretched apart to create space. Like the knitted synthetic turf, the honeycomb system has grass-like fibers extending from each knot and is coated. In the stretched condition, the honeycomb system is heat treated to retain the plurality of voids which allow the natural turf to grow and the difficulty of creating voids for the natural turf to grow was overcome. The honeycomb system is knitted in 2 meter widths which are then expanded to 4 to 20 meter widths making it cost effective to produce. However, this same elasticity makes the support unstable in use. The design of the honeycomb structure makes it very difficult to create an even distribution of fibers, because expanding the structure inherently creates inconsistent spacing and therefore inconsistent fiber distribution, even if the grass-like fibers only extended at regular intervals along the braid. The instability and inconsistency of the honeycomb structure may cause further inconsistencies, for example:

(a) inconsistent fiber distribution leading to an inconsistent playing surface performance;

(b) inconsistent fiber orientation leading to an inconsistent playing surface performance;

(c) at the time of planting the natural grass plants, the sand infilling depth may be inconsistent; and (d) during the processes of harvesting, transport and installation, the turf rolls may lack the desired stability beneath and within each roll and that may result in roll inconsistencies which will result in surface inconsistencies for players.

The hybrid turf support according to the present invention uses a knitted reticulated net, whereby the knitting technique is changed to create a stable (preferably square) formation having openings to allow the natural turf to grow. The knitting technique was further changed to ensure the grass-like fibers are evenly distributed, that is, not all knots have grass-like fibers extending from them (preferably, only those knots at the corner of each square). Hence the difficulty of creating a stable formation with a plurality of voids to grow natural turf was overcome, while at the same time creating an even distribution of grass-like fibers to create consistency in the playing surface. The resultant hybrid turf surface has the necessary strength to provide support and guarantee the integrity of each turf roll through the moving processes (harvest, transport, installation).

BRIEF DESCRIPTION OF DRAWINGS

Various embodiments/aspects of the invention will now be described with reference to the following drawings in which:

FIG. 2 is a configuration view illustrating a progressive direction of yarns 'A' in the hybrid turf support according to FIG. 1.

DETAILED DESCRIPTION OF A PREFERRED EMBODIMENT

Hereinafter, one embodiment of the present invention will be described in detail with reference to accompanying drawings.

Figure 1:
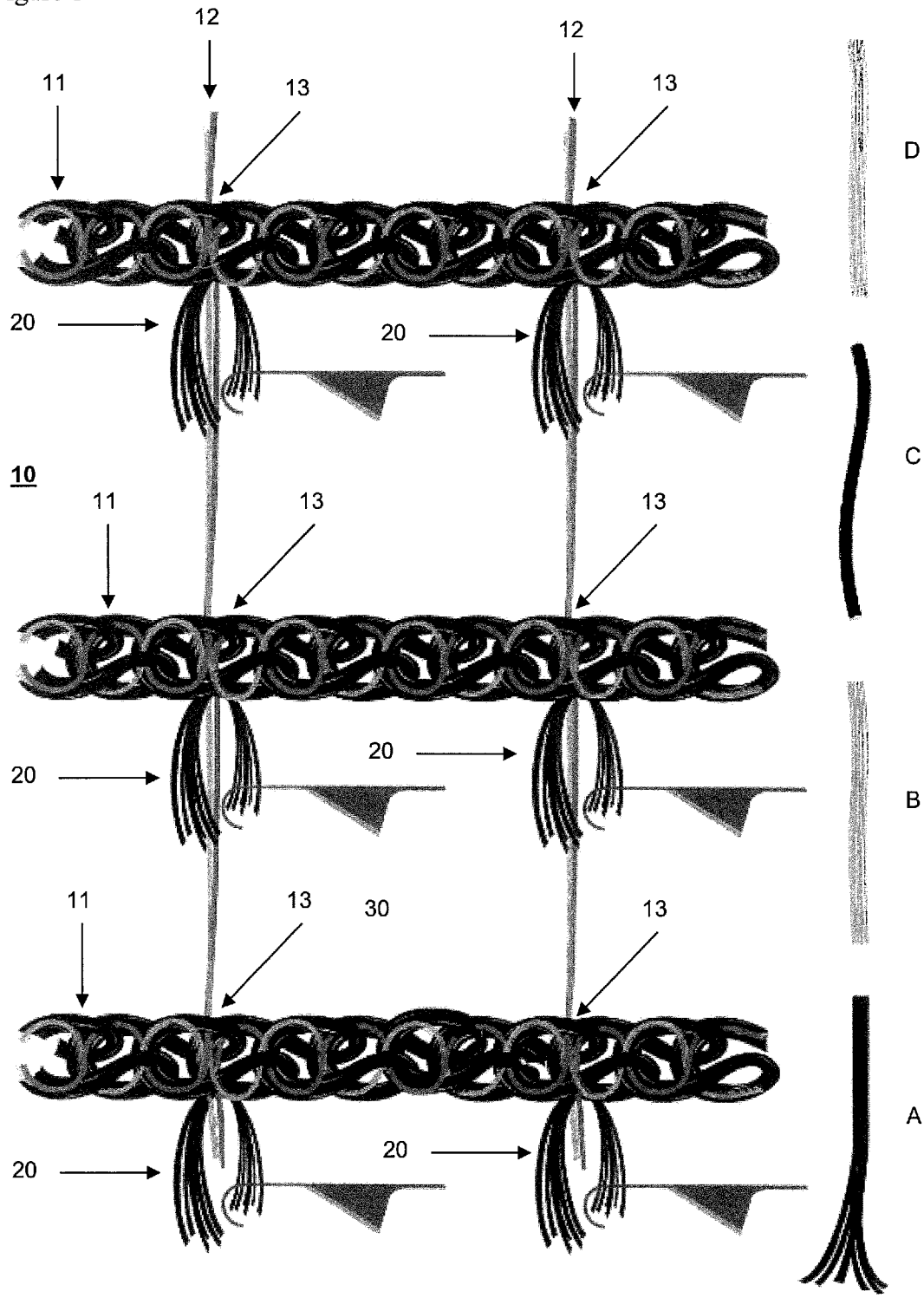
FIG. 1 is a schematic view of a hybrid turf support according to one embodiment of the present invention.

As illustrated in FIG. 1, a hybrid turf support for use with natural turf in a hybrid turf system for use in a sporting venue according to the present invention comprises: (i) a knitted reticulated support 10 having six yarns A for forming grass-like fibers, one warp B and two wefts C and D configured into a knitted loop structure to form braids 11 (longitudinally extending members) aligned at constant intervals in a first direction, with linkage parts 12 (laterally extending members) formed by overlapping and extending two wefts C and D at constant intervals in a second direction, so that braids 11 and linkage parts 12 form intersections 13 and openings 30 for vegetation between the intersections 13; and (ii) grass-like fibers 20 formed only at the intersection 13 of the braids 11 and the linkage parts 12.

Further, the hybrid turf support according to this preferred embodiment is characterized in that:

intervals between the adjacent intersections along the first and second directions range from 3 mm to 50 mm (i.e., 3, 10, 12, 15, 18, 20, 22, 25 or 50), respectively;

openings 30 are substantially square-shaped; and each of grass-like fibers 20 has a length of 20 mm to 80 mm (i.e., 20, 35, 40, 45, 50, 55, 60, 65, 70, 75 and 80), and is a synthetic fiber multi-filament including at least three monofilaments having a single yarn thickness of 300 micron to 450 micron and a single yarn weight of 1800 denier to 3300 denier and a total yarn weight of 5400 denier to 19800 denier.

Figure 2:
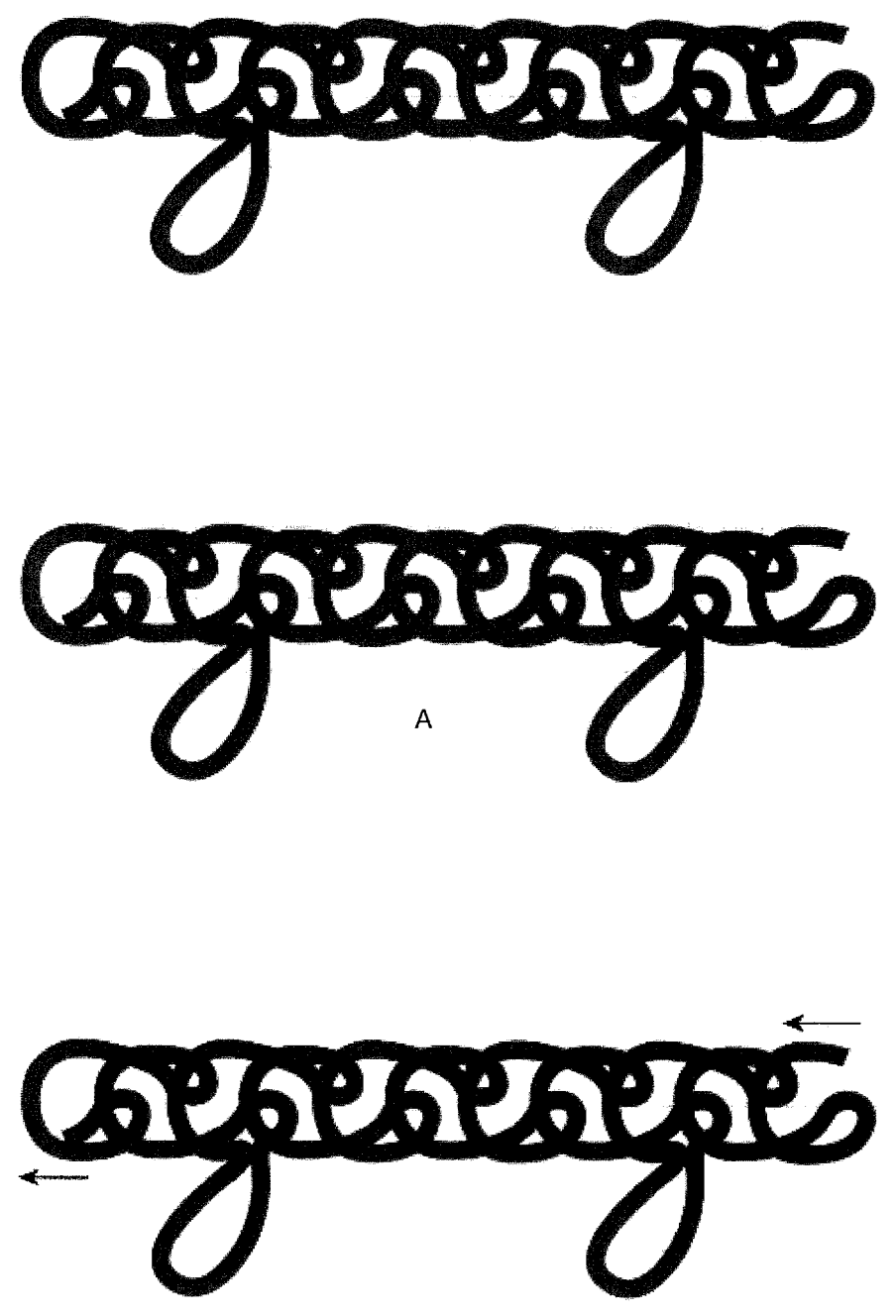
Figure 3:
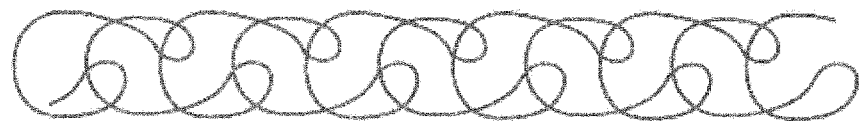
FIG. 3 is a configuration view illustrating a progressive direction of warps 'B' in the hybrid turf support according to FIG. 1.
Figure 3:
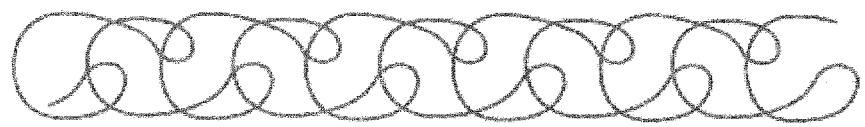
Figure 3:
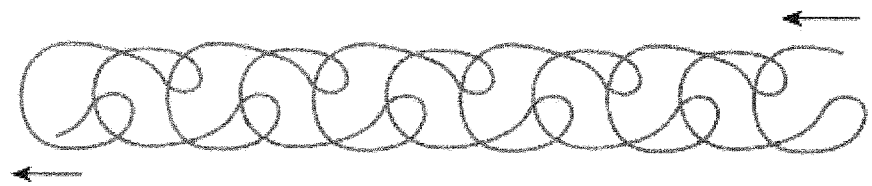
Figure 4:
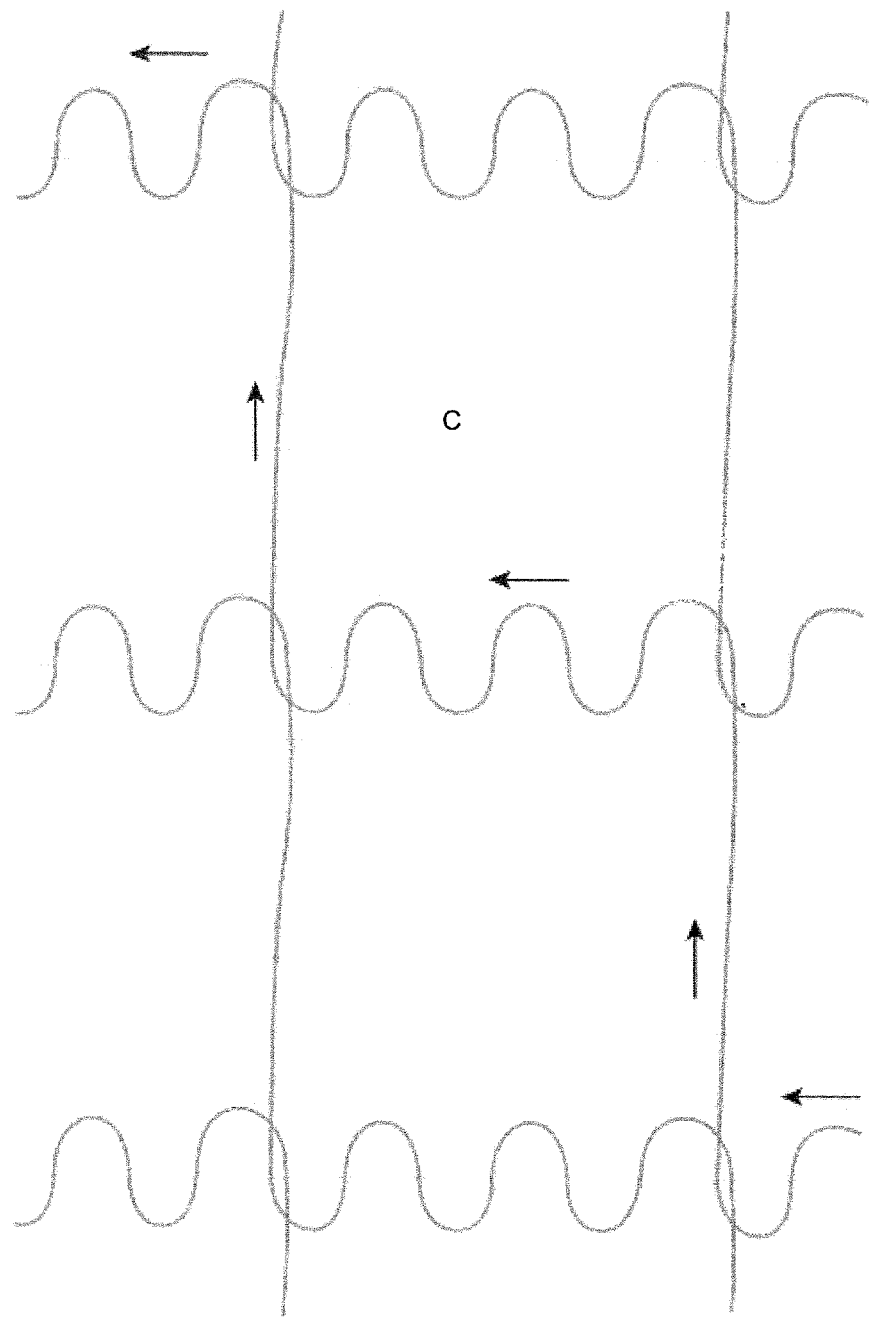
FIG. 4 is a configuration view illustrating a progressive direction of wefts 'C' in the hybrid turf support according to FIG. 1.
Figure 5:
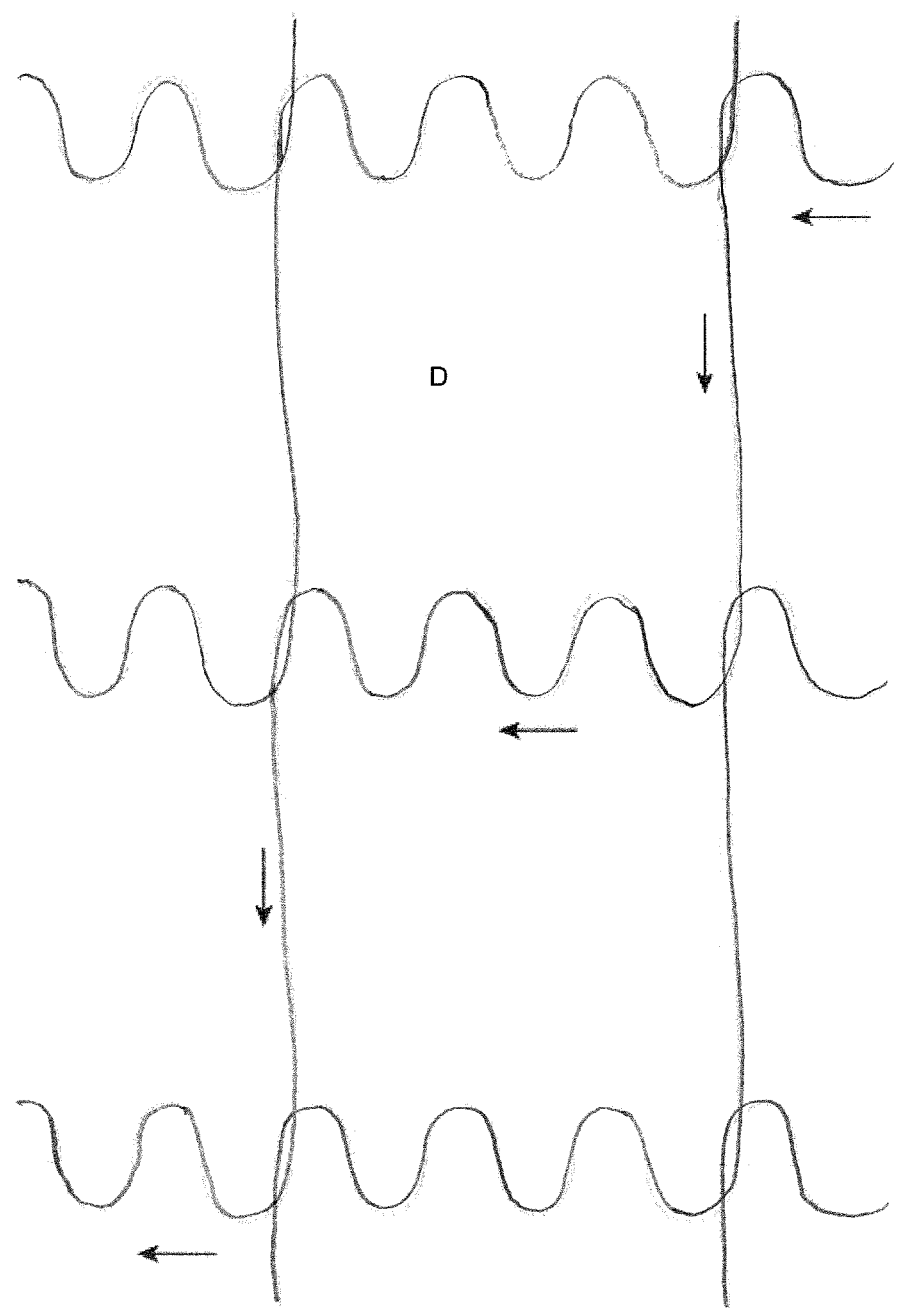
FIG. 5 is a configuration view illustrating a progressive direction of wefts 'D' in the hybrid turf support according to FIG. 1.
Figure 6:
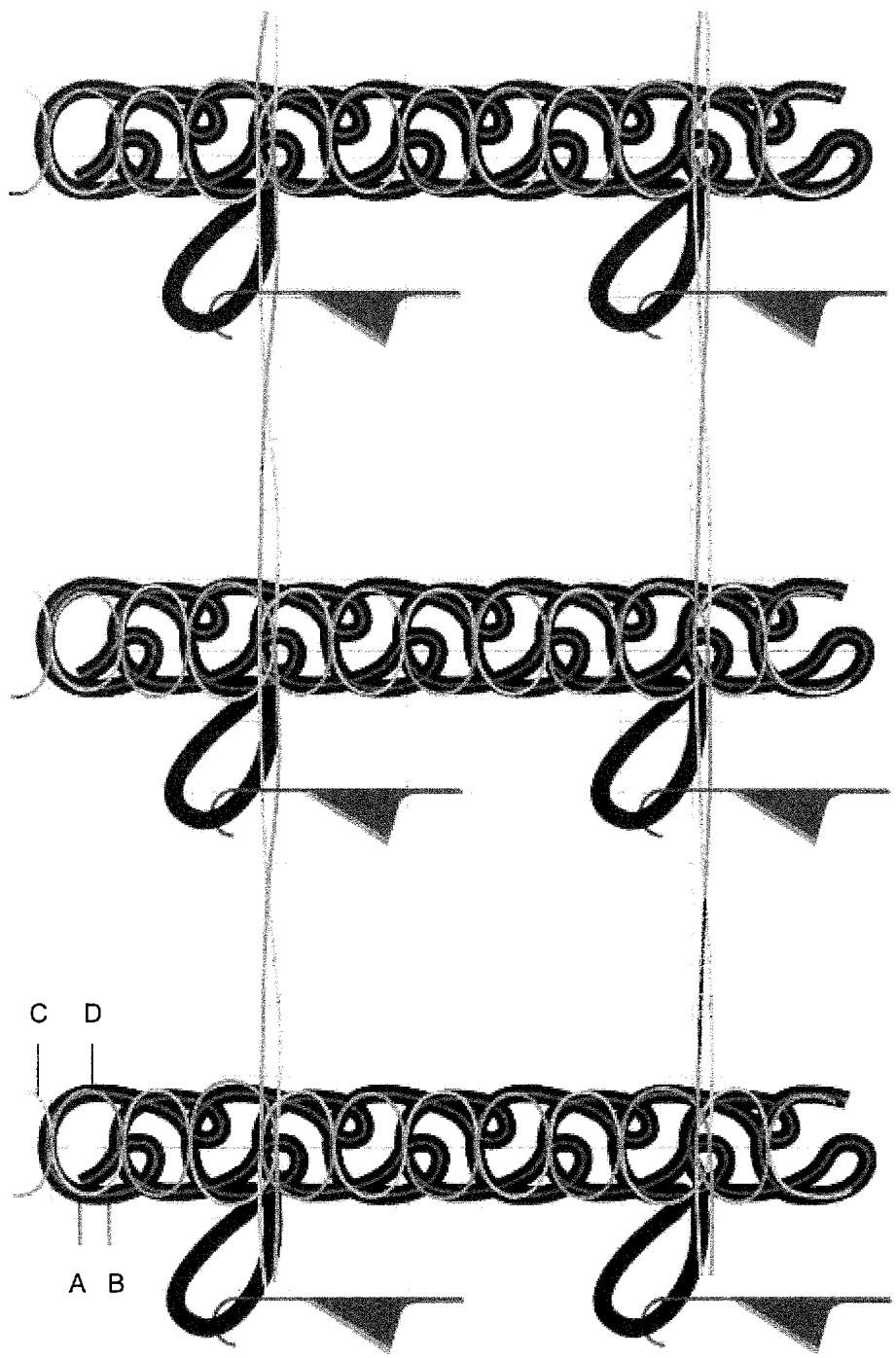
FIG. 6 is a schematic view illustrating an interlacing condition of the yarns A, warps B, wefts C and D in the hybrid turf support according to FIG. 1.

With regard to one embodiment of a process for producing the knitted reticulated support 10 according to the present invention, as a result of simultaneously feeding yarns A for forming grass-like fibers 20, warps B and wefts C and D into a knitting system (for example, a Raschel knitting machine), the yarns A for forming grass-like fibers 20 are knitted in a progressive direction illustrated in FIG. 2, the warps B are knitted in a progressive direction illustrated in FIG. 3, the wefts C are knitted in a progressive direction illustrated in FIG. 4, and the wefts D are knitted in a progressive direction illustrated in FIG. 5, respectively, so as to fabricate the knitted reticulated support 10 having such a knitting structure as illustrated in FIGS. 1 to 6. The loops of yarns A are then cut with a knife to form the grass-like fibers (20).

In the braid 11 of knitted reticulated support 10, the yarns A for forming grass-like fibers 20, the warps B, and the wefts C and D are interlaced together, and a linkage part 12 of knitted reticulated support 10 is formed by overlapping the wefts C and D and extending wefts C and D to an adjacent braid. Further, the yarns A for forming grass-like fibers 20, the warps B, and the wefts C and D are also interlaced together at the intersections 13 of braid 11 and linkage part 12.

In a turf-laid sporting venue, the ratio of an area of grass-like fibers to the entire area of the natural turf and the grass-like fibers in the hybrid turf system can be maintained in the range of 2% to 7% which is uniformly distributed to provide consistent playing characteristics. Further, since the grass-like fibers 20 are the appropriate length and fineness, and uniformly distributed, they protect the natural turf from damage to the leaf, crown, and roots, and protect the plant from scalping, divotting or other damage during sport events.

Figure 7:
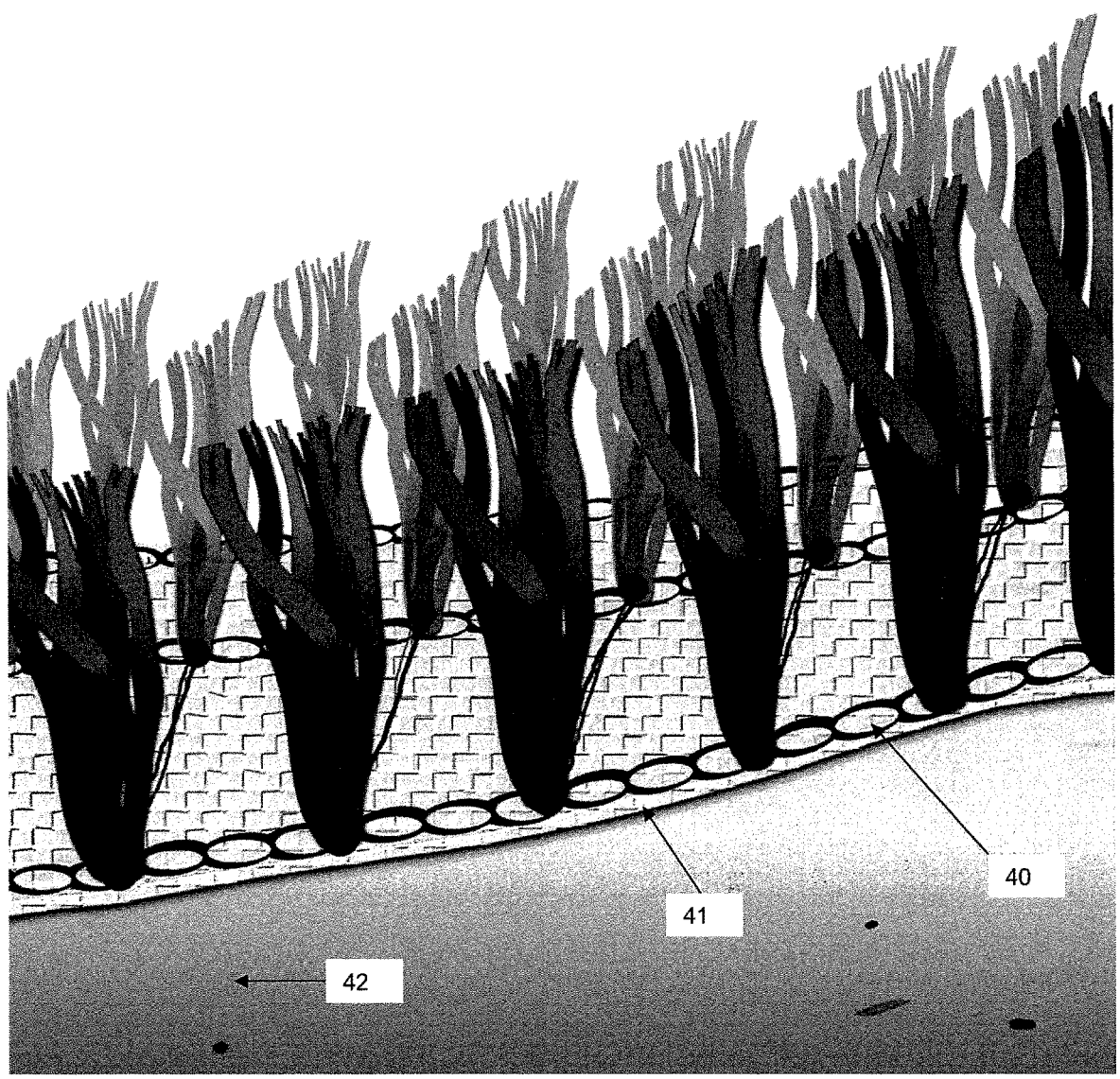
FIG. 7 is a perspective view schematically illustrating a hybrid turf support according to one embodiment of the present invention.
Figure 8:
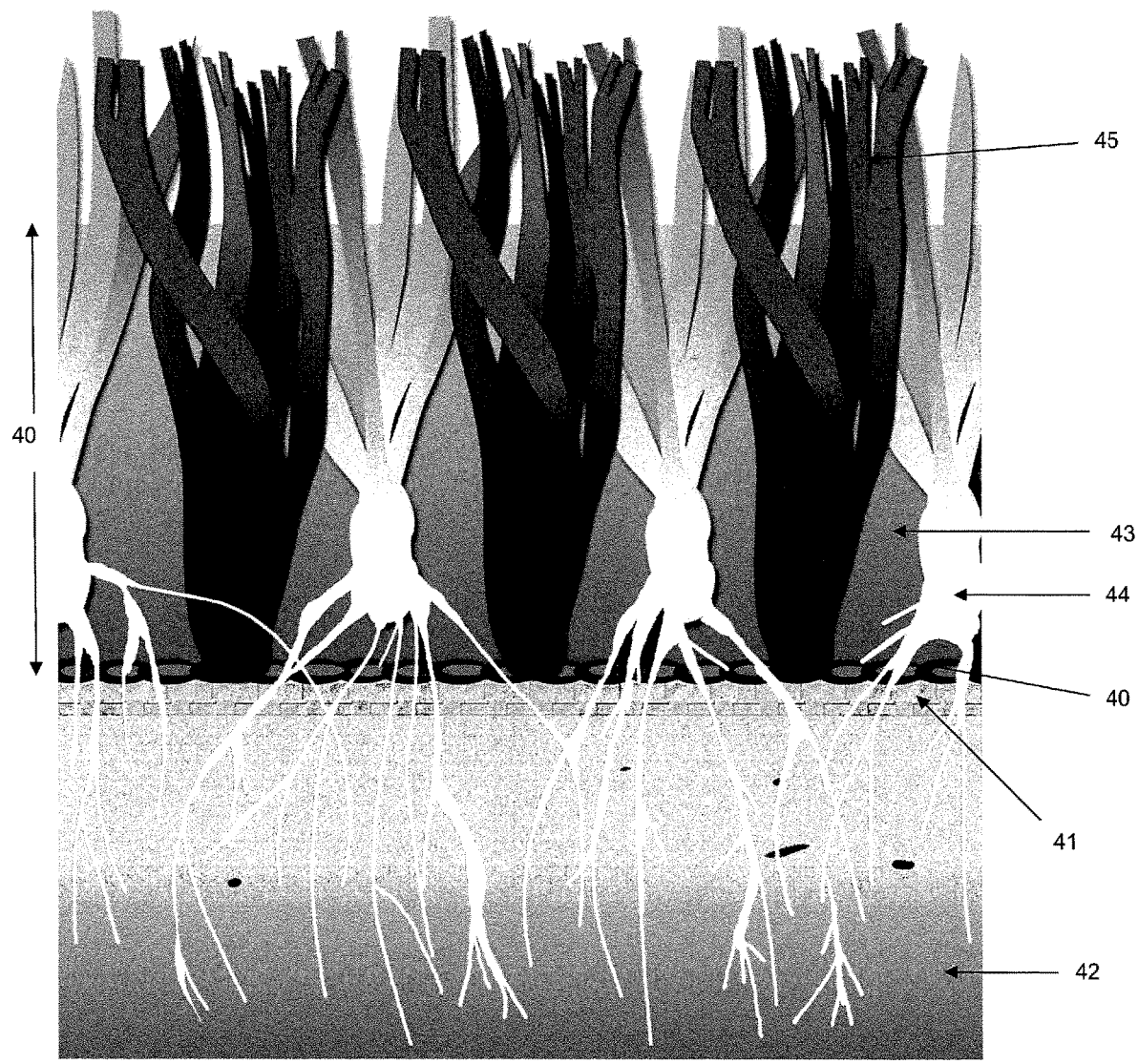
FIG. 8 is a cross-sectional view of a hybrid turf system according to one embodiment of the invention.

In FIG. 7, a hybrid turf support (40) according to one aspect of the invention having a retention backing (41) is laid out on a surface adapted for supporting a turf surface (42). A layer of growth media (43) is then infilled, sometimes progressively, to a depth of about 40 mm onto the hybrid turf support and natural grass (44) grown. Typically, the growth media (43) is natural sand and soil, but other forms of growth media may be used. The growth media may have been combined with natural grass seeds prior to infilling or, after infilling, natural grass sprigs or plants may be planted into the growth media. The natural grass plants (43) are then allowed to grow until the hybrid turf system is formed. The resultant hybrid turf system according to the invention is shown in cross-section in FIG. 8. In the final hybrid turf system shown, the grass like fibers (45) are about 60 mm, allowing for about 40 mm infill and about 20 mm extending into the natural grass leaf zone. The grass-like fibers (45) thus support the leaf blades of the natural grass plants (43), thereby increasing the playing hours of the natural grass plants and protecting the natural grass plants from wear and tear.

Figure 9A:
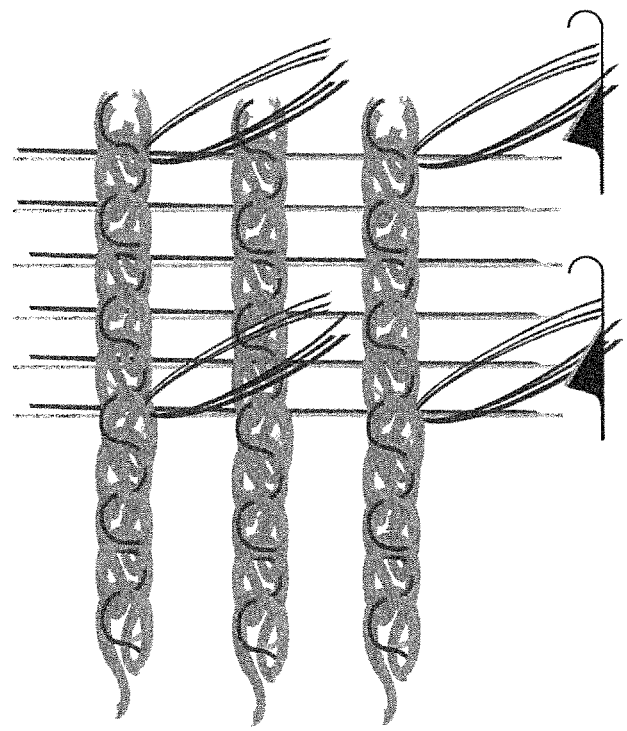
FIGS. 9A and 9B are schematic views of alternative embodiments of a hybrid turf support according to the present invention.
Figure 9B:
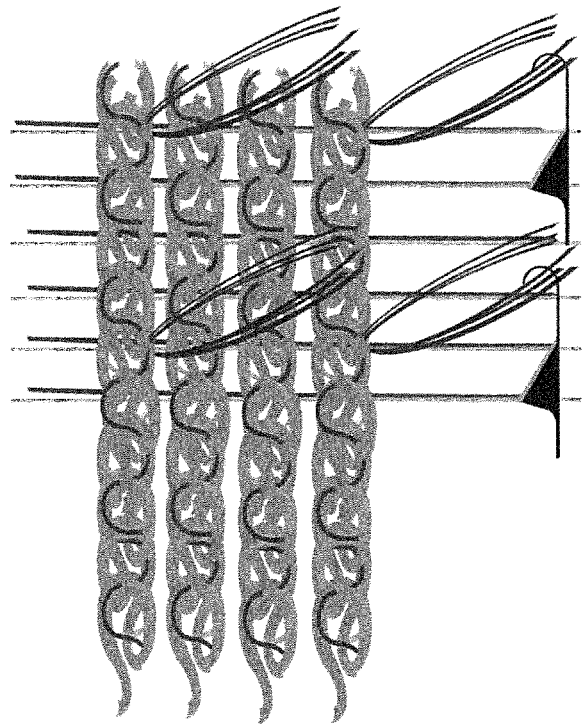

FIGS. 9A and 9B illustrate the knitting of a hybrid turf support according to alternative embodiments of the present invention. In these embodiments, the plurality of grass-like fibers extend upwards at spaced out intersections of the first plurality of longitudinally extending members with the second plurality of laterally extending members, and not at every intersection.

Trial 1

The hybrid turf system according to the invention was tested in accordance with the Labosport Scoreplay™ system to measure and categorise the performance and quality of the surface. A combination of game performance, construction and agronomy testing was undertaken to provide a comprehensive assessment.

The hybrid turf system according to the invention was about 7 to 8 weeks old from germination. The surface had been used for soccer training on three occasions prior to the testing. Minimal surface scarring was present.

A summary of the observations follows:

turf cover was excellent with near full density being achieved;

turf vigour was optimal with only typical very low levels of leaf spot being present;

all playing characteristics (ball roll, shock absorption, vertical deformation, energy restitution, rotational resistance, ball rebound and surface regularity) were either within optimal or near optimal ranges;

Traction fell on the slightly high side of ideal being marginally excessive, however slightly excessive traction is common in young hybrid grass systems and tends to reduce as some surface organic material is developed;

firmness was slightly on the high side however no treatments (such as spiking or verti-draining) had been implemented to reduce this. Firmness was slightly variable but this was likely due to the moisture content of the grounds.

Root depths were excellent, the biodegradable backing to the system had decomposed and rooting had progressed through all the layers into the underlying topsoil in most instances. This contributed to the high levels of plant vigour experienced.

Infiltration rates were in line with a suspended water table and were excellent for the construction method used.

Surface gradient falls were in line with the original field installation and surface deviations were within optimal levels.

Moisture readings were taken from both 0-50 mm and 50-100 mm to review the impact of the profile installed. 0-50 mm presented 15% moisture and 50-100 mm 35%. The profile installed is thus encouraging dry surfaces with moisture retention at depth. This may be encouraging the deeper roots experienced.

The rotational resistance was high given the ratio was 6% grass-like fibers to 94% natural grass turf. The ratio of grass-like fibers to natural grass turf also contributed to a firmer surface. The above results highlight the superior performance attained, even though maintenance of the pitch and use across the pitch was inconsistent prior to and at the time of testing.

Trial 2

HG Sports Turf (AU) Pty Ltd trialled the potential to reuse and/or recycling a hybrid turf support according to the invention.

A hybrid turf surface according to the invention was laid at a stadium. A Rattlesnake machine from Total Reclamation Services was used to remove the turf. The removal of the hybrid turf surface was assessed with respect to the removal and separation of the natural grass, the sand and the plastic to enable reuse and/or recycling. It is important that the plastic does not contaminate the natural grass and/or sand, and vice versa, as this would cause the components to not be recyclable. The hybrid turf surface according to the invention was successfully removed and separated. The hybrid turf support had sufficient strength to pass through the equipment with the knitted reticulated support and grass-like fibers intact. Little or no plastic fibers were distributed through the sand or natural grass which was suitable for recycling into the horticultural industry. The hybrid turf support could be washed and recycled or disposed of as general waste.

Trial 3

The porosity and moisture retention of root zone sand was tested with and without a hybrid turf system according to the invention.

Raw sand was tested to determine its particle size distribution, saturated hydraulic conductivity, volumetric moisture retention at 30 cm suction, total and air filled porosity and its moisture release curve.

This testing was then repeated on sand with the inclusion of both a 12.7 mm and a 21.9 mm hybrid turf system according to the invention, both with and without a viscose backing. The testing included saturated hydraulic conductivity, volumetric moisture retention at 27 cm suction for each of the full profile, root zone and infill zone and the capillary fringe.

A comparison of the performance of the raw and sand with a hybrid system according to the invention showed minor increases in the drainage rates when considering the total profile system tested.

In considering the volumetric water and porosity values, the tighter spacing of the 12.7 mm×12.7 mm hybrid turf system according to the invention creates a lower bulk density which then reflected the lower moisture retention and increased porosity and drainage.

This can be of benefit to the establishment of the natural grass turf, as it will encourage the root growth downwards towards the moisture reservoir at the capillary fringe. The 21.9 mm×21.9 mm hybrid turf system according to the invention only had a minimal effect on the bulk density values and therefore only minor variations were observed in relation to moisture retention, porosity and drainage.

During testing with the viscose retention backing on both the 12.7 mm×12.7 mm and 21.9 mm×21.9 mm hybrid turf systems according to the invention, the retention backing (viscose) was drawing (wicking) moisture out over the infill sand, which also led to lower moisture retentions values. It was concluded that the retention backing had no adverse effect on the sand.

The testing demonstrated that a 'mini perched water table' was not created in the infill sand above either the 12.7 mm×12.7 mm or the HERO 21.9 mm×21.9 mm hybrid turf system according to the invention. Importantly, the hybrid turf support according to the invention was not dividing the sand into two separate zones. The infill sand was working together with the underlying root zone sand. This is essential for root development from the infill sand into the root zone sand and such root development is essential to support a strong, healthy natural grass turf plant.

Prior art hybrid systems having a closed backing have been known to create a 'mini perched water table' causing the natural grass turf to not establish roots beyond the backing reducing the durability and health of the natural grass turf.

The word 'comprising' and forms of the word 'comprising' as used in this description and in the claims does not limit the invention claimed to exclude any variants or additions.

Modifications and improvements to the invention will be readily apparent to those skilled in the art. Such modifications and improvements are intended to be within the scope of this invention.

The claims defining the invention are as follows:

1. A hybrid turf support for use with natural grass to form a stable hybrid turf system, the hybrid turf support comprising:
    (a) a knitted reticulated support comprising:
        (i) a plurality of warp members oriented in a longitudinal direction; and
        (ii) a first plurality of weft members, each first weft member comprising at least four portions (A), (B), (C), and (D), wherein:
        portion (A) is oriented in the longitudinal direction and is interlaced with a first warp member; portion (B) is oriented in a lateral direction between the first warp member and a second warp member; portion (C) is oriented in the longitudinal direction and is interlaced with the second warp member; and portion (D) is oriented in the lateral direction between the second warp member and a third warp member; and
        (iii) a second plurality of weft members, each second weft member comprising at least four portions (E), (F) (G). and (H), wherein:
        portion (E) is oriented in the lateral direction between the first warp member and the second warp member; portion (F) is oriented in the longitudinal direction and is interlaced with the second warp member; portion (G) is oriented in the lateral direction between the second warp member and the third warp member; and portion (H) is oriented in the longitudinal direction and is interlaced with the third warp member,
        wherein the first plurality of weft members and the second plurality of weft members extend in opposing step-wise progressions;
        wherein the plurality of warp members intersects with the first and the second plurality of weft members to form an intersection to define a plurality of substantially rectangular-shaped openings suitable for natural grass to grow; and
        wherein the weft members are anchored at each end to at least one of the warp members; and
    (b) a plurality of artificial grass fibers extending upwardly from the knitted reticulated support, the artificial grass fibers comprising groups of fibers extending upwardly at substantially uniform intervals,
        wherein each artificial grass fiber has a top which protrudes and extends upward from the knitted reticulated support, and a bottom fixed to the knitted reticulated support;
        wherein the plurality of artificial grass fibers are knitted into the plurality of warp members; and
        wherein the warp members comprise chains of loops formed by warp knitting.

2. The hybrid turf support according to claim 1 wherein the plurality of artificial grass fibers extend upwards at the intersections of the warp members with the weft members.

3. The hybrid turf support according to claim 2 wherein at each intersection a portion of the plurality of artificial grass fibers extend upwards.

4. The hybrid turf support according to claim 2 wherein at every second intersection a portion of the plurality of artificial grass fibers extend upwards.

5. The hybrid turf support according to claim 2 wherein at every third intersection a portion of the plurality of artificial grass fibers extend upwards.

6. The hybrid turf support according to claim 1 wherein the plurality of artificial grass fibers are knitted into the warp members.

7. The hybrid turf support according to claim 1 wherein the openings are substantially square-shaped.

8. The hybrid turf support according to claim 1 wherein the intervals between the warp members and the intervals between the weft members are uniform.

9. The hybrid turf support according to claim 1 wherein each artificial grass fiber has a length in the range from 20 mm to 80 mm.

10. The hybrid turf support according to claim 1 wherein each artificial grass fiber comprises a synthetic fiber multifilament comprising at least three mono-filaments having a single yarn thickness of 300 micron to 450 micron and a single yarn weight of 1800 denier to 3300 denier and a total yarn weight of 5400 denier to 19,800 denier.

11. The hybrid turf support according to claim 1 further comprising a coating to stabilise the knitted reticulated support.

12. The hybrid turf support according to claim 1 further comprising a retention backing.

13. The hybrid turf support according to claim 1 further comprising a removable root-pruning backing.

14. The hybrid turf support of claim 1, wherein a ratio of an area of the plurality of artificial grass fibers to a total area of the hybrid turf support is 2% to 7%.

15. A hybrid turf system comprising the hybrid turf support according to claim 1 and natural turf.

16. A hybrid turf system comprising:
   (a) a surface adapted for supporting a turf surface;
   (b) a hybrid turf support according to claim 1;
   (c) a layer of growth media located on the hybrid turf support; and
   (d) a plurality of natural grass plants or precursors thereof wherein the roots extend downwardly through the layer of growth media and the hybrid turf support, and wherein some of the roots engage with the hybrid turf support.

17. A method of creating a hybrid turf system comprising a hybrid turf support according to claim 1 and natural turf, the method comprising the steps of:
   (a) placing a hybrid turf support according to claim 1 on a surface adapted for supporting a turf surface located at a growth site; and
   (b) placing on the hybrid turf support a layer of growth media and natural grass seeds, sprigs or plants to form the natural turf.

18. The method of claim 17, further comprising (c) cutting the hybrid turf system into one or more strips of a predetermined width and (d) moving the strips of the hybrid turf system to a target site.

19. The method of claim 17 farther comprising removing a removable root-pruning backing from the turf system between the cutting and moving steps to prune the roots of natural grass plants extending through the removable root-pruning backing.

20. A method for removing a hybrid turf system comprising growth media, natural turf and the hybrid turf support according to claim 1 from a site, comprising:
   (a) cutting the hybrid turf system into one or more strips of a predetermined width; and
   (b) separating the cut strip of hybrid turf from a base at a separation station for separating the natural turf and the growth media from the hybrid turf support, and
   (c) collecting the separated hybrid turf support back to the base and the mixture of natural turf and growth media for reuse or recycling.

21. A hybrid turf support for use with natural grass to form a stable hybrid turf system, the hybrid turf support comprising:
   (a) a knitted reticulated support comprising:
      (i) a plurality of warp members oriented in a longitudinal direction;
      (ii) a first plurality of weft members, each first weft member comprising at least four portions (A), (B), (C), and (D), wherein:
   portion (A) is oriented in the longitudinal direction and is interlaced with a first warp member; portion (B) is oriented in a lateral direction between the first warp member and a second warp member; portion (C) is oriented in the longitudinal direction and is interlaced with the second warp member; and portion (D) is oriented in the lateral direction between the second warp member and a third warp member; and
      (iii) a second plurality of weft members, each second weft member comprising at least four portions (E), (F), (G), and (H), wherein:
   portion (E) is oriented in the lateral direction between the first warp member and the second warp member; portion (F) is oriented in the longitudinal direction between the second warp member and the third warp member; portion (G) is oriented in the lateral direction between the second warp member and the third warp member; and portion (H) is oriented in the longitudinal direction and is interlaced with the third warp member,
   wherein the first plurality of weft members and the second plurality of weft members extend in opposing step-wise progressions;
   wherein the plurality of warp members intersects with the first and the second plurality of weft members to form an intersection to define a plurality of substantially square-shaped openings suitable for natural grass to grow; and
   wherein the weft members are anchored at each end to at least one of the warp members; and
   (b) a plurality of artificial grass fibers extending upwards at the intersections of the warp members and the weft members, the artificial grass fibers comprising groups of fibers extending upwardly at substantially uniform intervals,
   wherein each artificial grass fiber has a top which protrudes and extends upward from the knitted reticulated support, and a bottom fixed to the knitted reticulated support;
   wherein the plurality of artificial grass fibers is knitted into the plurality of warp member; and
   wherein the warp members comprise chains of loops formed by warp knitting.

22. The hybrid turf support of claim 21, wherein a ratio of an area of the plurality of artificial grass fibers to a total area of the hybrid turf support is 2% to 7%.

23. A hybrid turf system comprising the hybrid turf support according to claim 21 and natural turf.

\* \* \* \* \*